(12) United States Patent
Braunecker et al.

(10) Patent No.: US 7,649,621 B2
(45) Date of Patent: Jan. 19, 2010

(54) OPTICAL INCLINOMETER

(75) Inventors: Bernhard Braunecker, Rebstein (CH); Peter Kipfer, Berneck (CH)

(73) Assignee: Leica Geosystems AG, Heerbrugg (CH)

( * ) Notice: Subject to any disclaimer, the term of this patent is extended or adjusted under 35 U.S.C. 154(b) by 291 days.

(21) Appl. No.: 10/560,432

(22) PCT Filed: Jun. 1, 2004

(86) PCT No.: PCT/EP2004/005879
§ 371 (c)(1),
(2), (4) Date: Mar. 21, 2006

(87) PCT Pub. No.: WO2005/001377
PCT Pub. Date: Jan. 6, 2005

(65) Prior Publication Data
US 2006/0152710 A1 Jul. 13, 2006

(30) Foreign Application Priority Data
Jun. 23, 2003 (EP) .................................. 03101841

(51) Int. Cl.
*G01B 11/26* (2006.01)
(52) U.S. Cl. ................................. 356/139.1
(58) Field of Classification Search ............... 356/139.1
See application file for complete search history.

(56) References Cited
U.S. PATENT DOCUMENTS

| 4,239,392 | A | | 12/1980 | Pohle |
| 4,290,043 | A | * | 9/1981 | Kaplan ......................... 340/984 |
| 4,474,467 | A | * | 10/1984 | Hardy et al. ................. 356/521 |
| 5,371,951 | A | | 12/1994 | Piske |
| 6,057,916 | A | * | 5/2000 | Kitajima ................... 356/139.1 |
| 6,088,090 | A | | 7/2000 | Hoshi et al. |
| 6,184,974 | B1 | * | 2/2001 | Neal et al. ................... 356/121 |
| 6,376,819 | B1 | * | 4/2002 | Neal et al. ................. 250/201.9 |
| 6,476,943 | B1 | * | 11/2002 | Yertoprakhov ............... 359/15 |
| 2001/0024270 | A1 | * | 9/2001 | Shirai et al. ................ 356/3.04 |
| 2003/0011757 | A1 | * | 1/2003 | Hirohara et al. ................. 356/6 |

FOREIGN PATENT DOCUMENTS

| DE | 41 10 858 A1 | 10/1992 |
| DE | 196 10 941 A1 | 9/1997 |
| DE | 196 21 189 A1 | 11/1997 |
| DE | 198 00 844 A1 | 7/1999 |
| DE | 198 19 610 C1 | 8/1999 |
| WO | WO 03/104748 A1 * | 12/2003 |

* cited by examiner

*Primary Examiner*—Thomas H Tarcza
*Assistant Examiner*—Luke D Ratcliffe
(74) *Attorney, Agent, or Firm*—Oliff & Berridge, PLC

(57) ABSTRACT

The invention relates to an optical inclinometer. According to the invention, an incline-dependent medium, e.g. a liquid surface, is positioned in the pupil of an optical subsystem and a detectable wave front is imaged onto a detector by means of said medium. A phase displacement of radiation emitted from a radiation source is caused by said medium; the interaction of the radiation and the medium can take place during reflection or transmission. An aberration of the wave front caused by the medium can be analyzed by means of a wave front sensor and compensated by an evaluation unit or the detector. A wave front sensor having a diffractive structure formed upstream of each subaperture is compact and increases the resolution and the detectable angular region of the inclinometer.

35 Claims, 6 Drawing Sheets

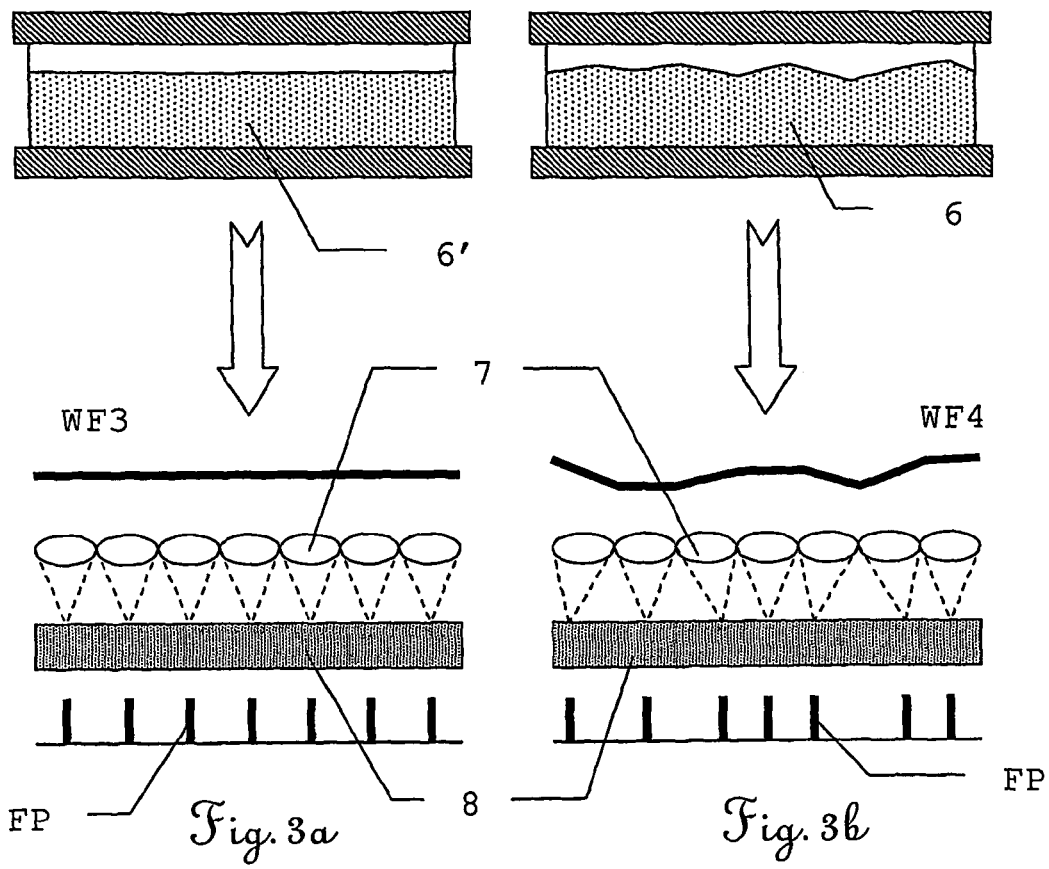
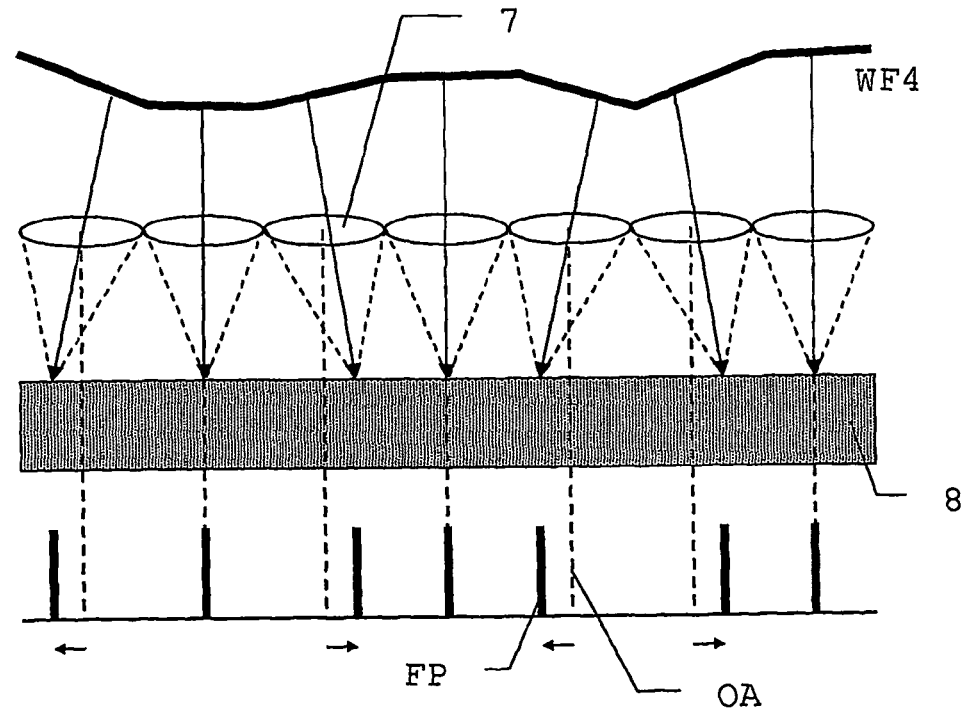
Fig. 4

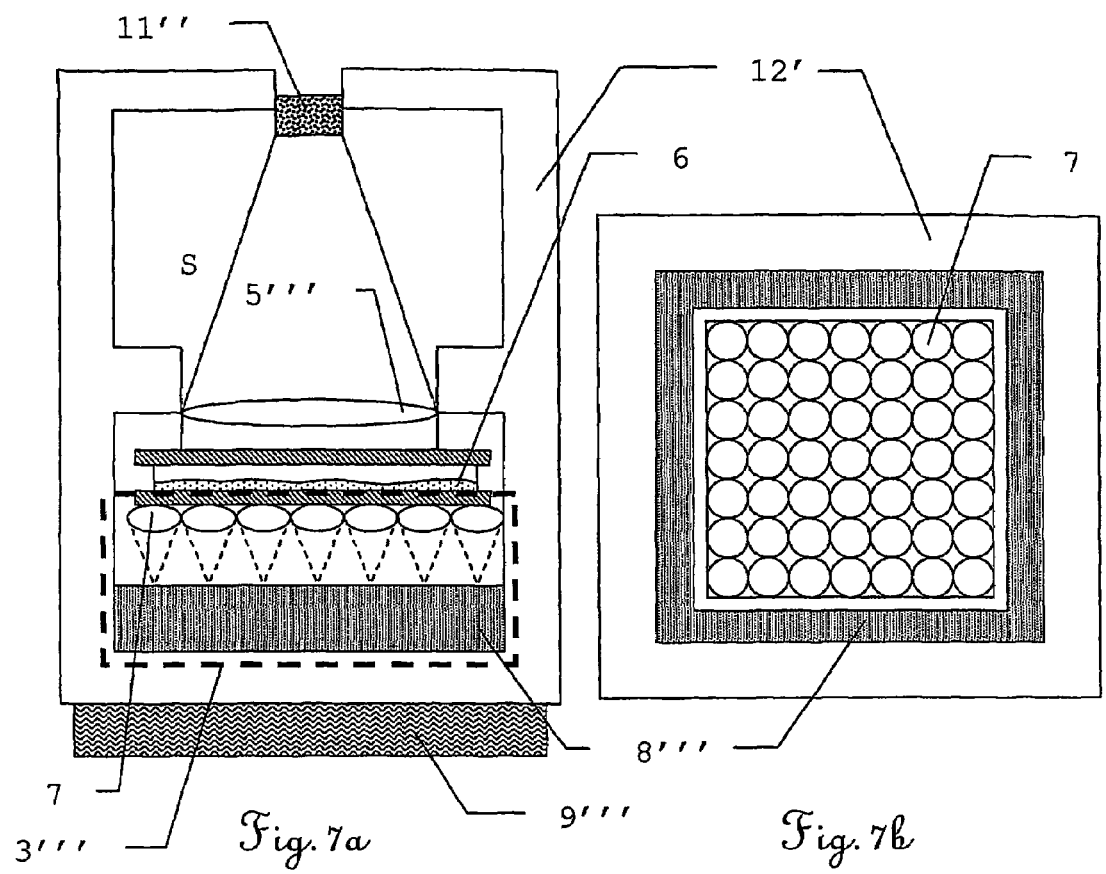
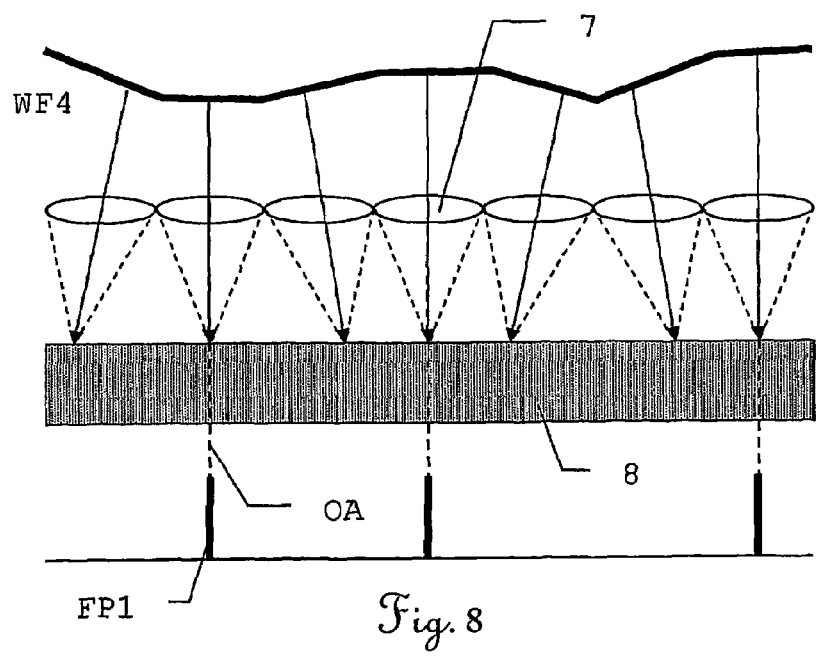

OPTICAL INCLINOMETER

The invention relates to an optical inclinometer according to the precharacterizing clause of Claim 1, a method for measuring the inclination of a device according to the precharacterizing clause of Claim 13 and a geodetic device having such an inclinometer, a method for compensating vibrations and/or random fluctuations and a wavefront sensor for use in an optical inclinometer according to the precharacterizing clause of Claim 20. Inclinometers of various designs have long been used in all areas in which the position of a device is to be taken into account. It is particularly true for measurements in the geodetic area or in the building trade.

In general, optical inclinometers of the generic type and of the prior art are realized by positioning a liquid surface in the pupil of an optical substance. This liquid as a medium produces a phase shift of radiation incident from a radiation source, it being possible for the interaction of radiation and medium to take place during reflection or transmission, and the following relationships being applicable:

During reflection: $\phi = 2 \cdot P(x)$ (1)

During transmission: $\phi = (n-1) \cdot P(x)$ (2)

This parameter $\phi$ designates the phase shift, n designates the refractive index of the liquid and $P(x)$ designates the form function of the liquid surface, this being defined according to $$P(x) = 2\pi/\lambda \cdot x \cdot \cos(\alpha) \quad (3)$$

and $\lambda$ denoting the wavelength of the incident radiation, x denoting the lateral pupil coordinate and $\alpha$ denoting the angle of inclination relative to a reference line.

The angle of the liquid surface relative to the reference line can be deduced according to equation (3) from the phase shift $\phi$ measured using apparatus.

Patents DE 196 10 941 C2 and DE 198 19 610 C1 describe optical inclinometers of the generic type in which the change of direction of a light beam takes place as a reflection at an inclination-dependent surface of a liquid. A structure is focused onto one- or two-dimensional sensor elements. The inclination is deduced from the change in the position of the image of the structure.

The Laid-Open Application DE 41 10 858 discloses a two-axis inclinometer in which a geometrical figure is projected onto a linear array by means of an inclination-sensitive and beam-deflecting sensor. The sensor contains a liquid, the position of which relative to the device influences or deflects the projection of the figure on the linear array.

The International PCT Patent Application No. PCT/EP03/05206 describes an optical inclinometer in which a boundary layer between two media is focused onto a camera. The inclination of a device equipped with such an inclinometer is derived from the parameters of this boundary layer, such as, for example, the position and shape thereof.

In these inclinometers of the generic type, liquids are used in which the inclination-dependent position of the liquid surface is used indirectly or directly for deriving the angle of inclination. However, the fact that the use of a liquid surface is associated with a multiplicity of problems which are due especially to the dynamic properties of the liquid proves to be a disadvantage. Thus, deviations of the surface from an ideal plane are caused, for example, by vibrations or by convection and lead to a corresponding effect on the reflected or transmitted radiation.

As a result of these influences, various disturbances of the wavefront occur. A random unevenness of the liquid surface leads to a surface angle which varies as a function of location and no longer permits the acceptance of an angle of inclination $\alpha$ identical for the entire liquid surface. Moreover, in the case of accelerations of the medium or when thermal gradients occur, deformations of the surface result which can be modelled in principle as higher-order aspherical aberrations but to date have not been taken into account. As a result of such a disturbed surface, the image of a structure on a sensor is distorted or blurred or the contrast is reduced so that the measurement is associated with difficulty.

Approaches to date for compensation relate, for example, to handling measures for directly reducing the effects, such as, for example, the introduction of dead times during which an inclinometer warms up after commissioning, or equipment designs, such as, for example, sufficiently large dimensioning of the liquid containers. In addition, the possible area of use of an inclinometer can be limited, for example with regard to the permissible vibration or acceleration.

The objects of the present invention consist in general in the improvement of an optical inclinometer of the generic type.

In particular, one object consists in the provision of an inclinometer which has improved accuracy of measurement.

Further objects consist in the further miniaturizability of an inclinometer of the generic type and in the simplification of its design.

A further object consists in the provision of an inclinometer in which limitations of use with regard to time, in particular owing to thermal effects, are reduced or avoided.

A further object of the invention is to provide an inclinometer which has an extended area of use compared with the prior art, in particular with regard to mechanical stress due to vibrations.

A further object consists in the provision of a method which permits disturbances of a wavefront in an inclinometer to be taken into account algorithmically or electronically.

A further object of the present invention consists in ensuring a constructional integratability in geodetic devices or devices used in the building industry. This relates in particular to the use of existing electronic components as evaluation devices.

A further object consists in the provision of a wavefront sensor for an inclinometer, which permits measurement in a greater angle range and/or has higher resolution and/or a greater dynamic range.

These objects are achieved, according to the invention, by characterizing features of claims 1, 13 and 20, respectively, or by characterizing features of the subclaims.

The present invention relates to an optical inclinometer. The radiation source generates radiation by means of which a wavefront is focused by a medium, the position of which is inclination-dependent, onto a detector, it being possible for this detector to be a one-dimensional or multidimensional, in particular extensive, camera. The medium is held by a container. This container may consist, for example, of a can for holding a liquid. The imaging need not correspond to imaging in the optically exact sense. What is important is the transillumination of the container with at least one first medium present therein or held by said container or the reflection of the radiation at a surface or boundary layer of this medium, after which detection of the wavefront takes place in such a way that inclination can be deduced from this.

The structure can be superposed externally on the radiation, for example by means of a shutter or a transmission or reflection code, or may consist of a structure inherent in the radiation. What is important is a structure of the radiation field, which structure, after interaction with the inclination-dependent medium, is changed in its imaging on the detector so that the position of the medium can be deduced from this change. The inclination is determined relative to a reference line which serves as a reference and which usually coincides with a reference parameter of a device, for example of a reticule or of an alignment edge.

The radiation used may be in the visible or in the nonvisible spectral range and is as a rule determined by the technical and physical parameters of radiation source, detector and medium. In addition to conventional lamps of various types, light emitting diodes or lasers, in particular semiconductor lasers, can also be used as the radiation source, it being possible to guide the radiation by optical elements, such as, for example, optical fibres, the manner advantageous with respect to the device. Depending on the form of realization, the medium is transilluminated by this radiation or the medium serves for reflecting the radiation.

Examples of liquids suitable as the medium are mercury, water and silicone oil. Both reflection at a boundary layer and passage through a medium or a combination of the two can be used for fixing the position of the medium.

The image of the structure is projected after this reflection and/or transmission onto the camera and is picked up there and converted into electronic signals. For example, a CCD camera or a CMOS camera may serve as a suitable camera. Such a camera is obtainable, for example, as CMOS monochromatic image sensor ADCS 2120 from Agilent, which has a field of 640×480 pixels.

The signals generated by the camera are analyzed by an evaluation unit and evaluated with respect to the inclination of the device. A separate building block or a separate component can be used for this purpose. Alternatively, however, it is also possible to rely on any existing components of other devices. In an inclinometer integrated in the telemeter, for example the function of this evaluation unit can also be performed by the electronics used for the distance measurement. Similarly, sources already used for other purposes can also be used as a radiation source. Thus, in the example of the telemeter, a part of the laser light optionally used there for the distance measurement can be output and, preferably after scattering or beam diversion, used for the imaging.

According to the invention, troublesome effects of the interaction of the radiation field with the medium are taken into account by an analysis of information about the wavefront of the radiation, and the influence of a disturbed liquid surface thus compensated. Various suitable approaches for conversion by means of algorithm or circuit technology are available.

The illumination of the structure is advantageously effected by means of a plane or slightly spherical wave, which, however, after interaction with the medium, may have aberrations which may be caused, for example, by irregularities of the surface of the medium, but also by inhomogeneities in the interior of the medium, as are produced, for example, by convection. These disturbances of the surface or of the interior of the medium occur, for example, as a result of temperature gradients during the switch-on phase of the device or are superposed by external influences, such as, for example, vibrations. In order to keep these influences in a tolerable range, in inclinometers of the prior art the container dimensions are chosen to be sufficiently large so that miniaturization has to date encountered limits. A supplementary or alternative measure is the acceptance of dead times of the inclinometer, during which a transient process or compensation process takes place and the accuracy of measurement is limited.

An inclinometer according to the invention uses a detector which is in the form of a wavefront sensor or has a wavefront sensor for deriving information about the wavefront. Detector and wavefront sensor can advantageously be arranged directly after the medium. In order to avoid further impairments of the imaging quality, it is additionally advantageous, when transilluminating the medium, to choose the beam path which is perpendicular to the surface of the medium and, after leaving the medium, strikes the wavefront sensor directly.

An example of a suitable wavefront sensor is a Shack-Hartmann wavefront sensor (SHS), although, according to the invention, in principle other types of sensors can also be used. A Shack-Hartmann wavefront sensor has a microlens array, by means of which a multiplicity of subapertures is formed. These microlenses may be arranged both purely in the form of rows and therefore linearly and in the form of a matrix and hence extensively. By a suitable choice of focal distances of the microlens array, it is possible to establish a sufficiently high angle resolution. With an adequate knowledge of the wavefront, troublesome aberrations of the wavefront can be eliminated by calibration. In general, the lenses are used equidistant in a two-dimensional lateral arrangement, a matrix of focal points being generated. The shift of each focal point on the axis of the lens is a measure of the tilt of the wavefront within the aperture of this lens. With suitable algorithms, the entire wavefront can be approximately reconstructed from the sum of the focal points. By scanning the wavefront with the many subapertures, a substantial or complete reconstruction of the topography of the surface of the oil or of the wavefront can be effected, or only a part of the information can be used, for example for selecting image points of the detector with undistorted imaging. CCD and CMOS sensors can be used for detecting the position of the focal point, an array of at least 2×2 pixels being used for each subaperture. In this design, this corresponds to a quadrant sensor. Depending on the required resolution, however, it is also possible to use larger numbers of pixels per subaperture. For increasing the read-out speed and for reducing the noise, a combination to give superstructures of pixels is realizable. The use of purely linear wavefront sensors arranged in rows is also suitable.

By using a wavefront sensor, it is also possible to reduce the complexity of apparatus since no 4f optical system may be used and the microlens arrays can be easily and economically produced by replica methods.

The wavefront sensor provides information about parameters or the shape of the wavefront, which information can be used algorithmically or by means of circuit technology for compensating the aberrations. Firstly, the wavefront can be completely or partly analyzed with regard to its form function. In general, a wavefront $W(x,y)$ can be approximated by a sum of higher-order polynomials. A possible derivation is possible, for example, with the aid of Zernike polynomials. A wavefront $W(x,y)$ is represented as the sum $$W(x, y) = \sum_{0}^{\infty} C_n Z_n(x, y) \tag{4}$$

with the coefficient $C_n$, where the first ten polynomials $Z_n(x, y)$ can be defined in Cartesian coordinates as follows $Z_1(x,y) = y$ $Z_2(x,y) = x$ $Z_3(x,y) = -x^2 + y^2$ $$Z_4(x,y)=2xy$$

$$Z_5(x,y)=-1+2x^2+2y^2$$

$$Z_6(x,y)=-3x^2y+y^3$$

$$Z_7(x,y)=-x^3+3xy^2$$

$$Z_8(x,y)=-2y+3x^2y+3y^3$$

$$Z_9(x,y)=-2x+3x^3+3xy^2$$

$$Z_{10}(x,y)=x^4-6x^2y^2+y^4 \qquad (5)$$

Here, corresponding coefficients can also be assigned to special optical errors, such as, for example, $Z_5$ with respect to astigmatism.

In addition to the reconstruction of the wavefront, straightforward recognition of pixels is also possible, the coordinated aperture of which detects a flat section or a portion of the wavefront without tilt or disturbance. It is thus possible to ensure that only the content of such pixels is used for an evaluation and the faults are eliminated very close to the hardware.

In addition, the local information about the shape of the wavefront can also be correlated. Suitable algorithms, for example for wavelet transformation, which permit, for example, a reduction of the noise, are also available.

For increasing the performance characteristics of an optical inclinometer according to the invention, a wavefront sensor according to the invention can be used. In this wavefront sensor according to the invention, its resolution and absolute determination of the wavefront is increased by unique assignment of the wavefront sections. Wavefront sensors according to the Shack-Hartmann principle of the prior art use only the position determination of the focal point within the respective subaperture. The resolution is thus limited by the focal distance of the individual microlenses and the number of microlenses and the image points coordinated in each case with a microlens. Furthermore, no absolute determination of the wavefront is possible without modification of the microlens arrays, owing to the dark spots. In the wavefront sensor according to the invention, a diffractive element is introduced before the microlenses, by means of which element it is ensured that, instead of a focal point in the subaperture, a plurality of focal points of the diffraction orders generated or whole diffraction images are used for determining the ex act wavefront. It is possible to utilize the fact that, in addition to the image points coordinated in each case with a microlens, further image points of the detector are also illuminated. Separation and coordination of the illuminated structures with the respective subapertures can be realized by an algorithmic route by methods known per se. A readily distinguishable form of the diffraction structures, as can be realized, for example, by large intensity changes, for example as in the case of a bar code, is advantageous, it also being possible to take into account according to the invention, properties particularly suitable for code reconstruction, such as, for example, the use of an M-sequence.

By means of the method according to the invention or the device according to the invention, the transient phase after the device has been switched on can be shortened. It is also possible to reduce the dimensions of the container for the medium so that the inclinometer is further miniaturizable.

The method according to the invention and a device according to the invention are described in more detail below purely by way of example with reference to working examples shown schematically in the drawing. Specifically, FIG. 1a-b show the schematic diagram of an inclinometer with reflection according to the prior art;

FIG. 2 shows the schematic diagram of an inclinometer with transmission according to the prior art;

FIG. 3a-b show the schematic diagram of the arrangement and effect, according to the invention, of a wavefront sensor;

FIG. 4 shows the schematic diagram of the use, according to the invention, of a wavefront sensor;

Figure 9:
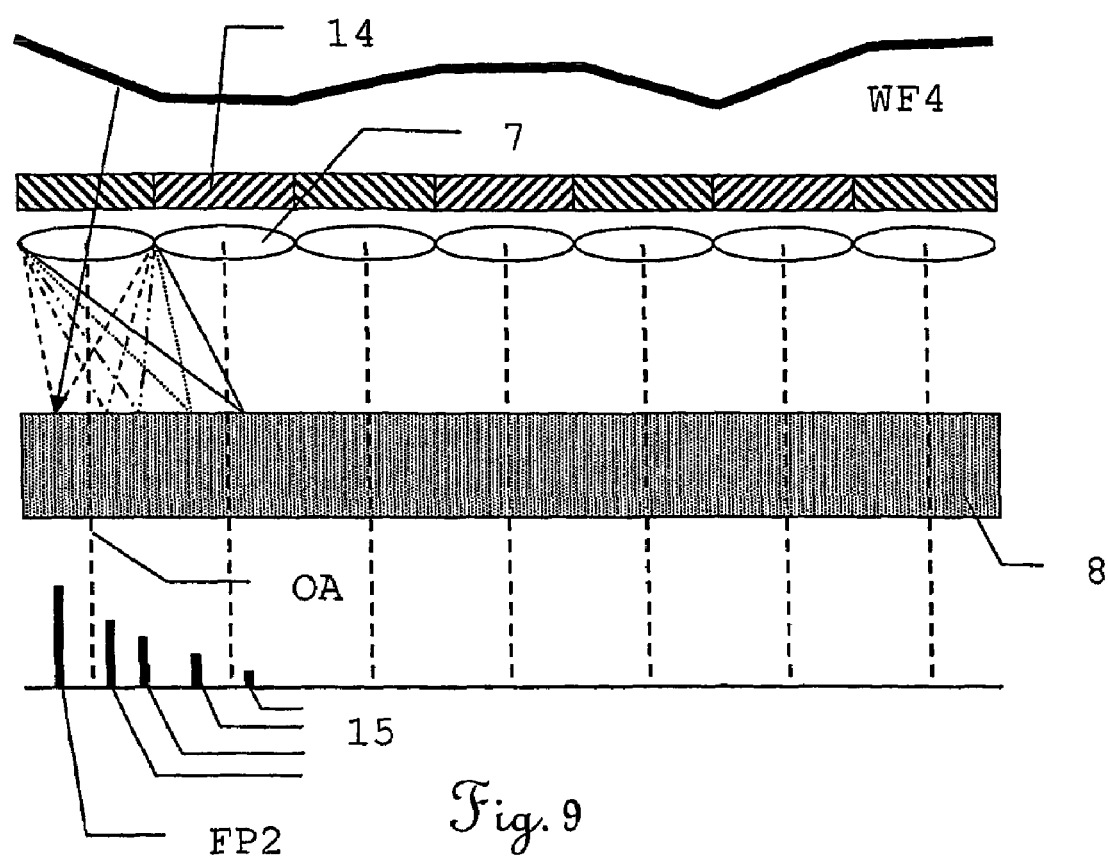

FIG. 7a-b show the schematic diagram of a third embodiment of an inclinometer according to the invention in side and plan view;

FIG. 8 shows a schematic diagram of a form of the method according to the invention; and FIG. 9 shows the schematic diagram of a wavefront sensor according to the invention.

Figure 1A:
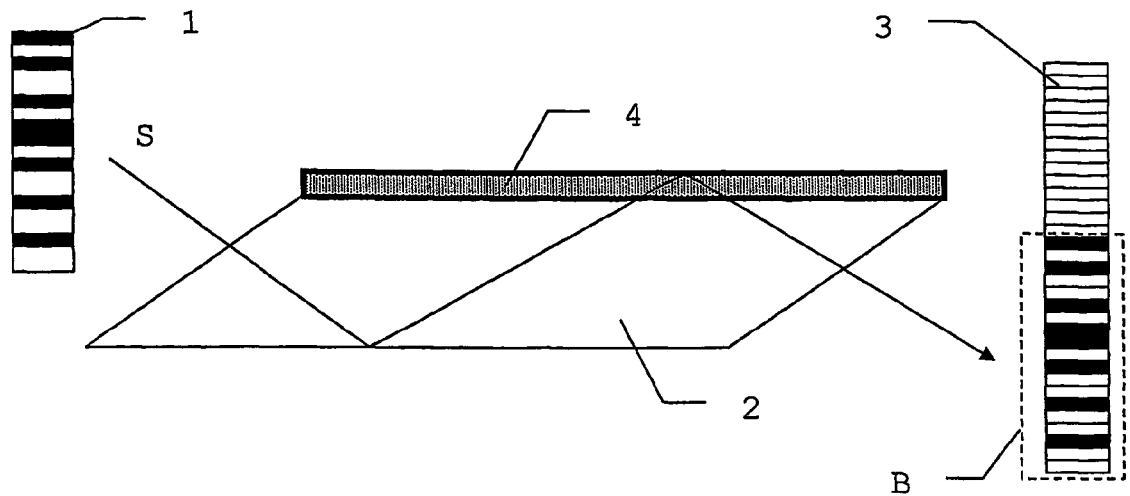
Figure 1B:
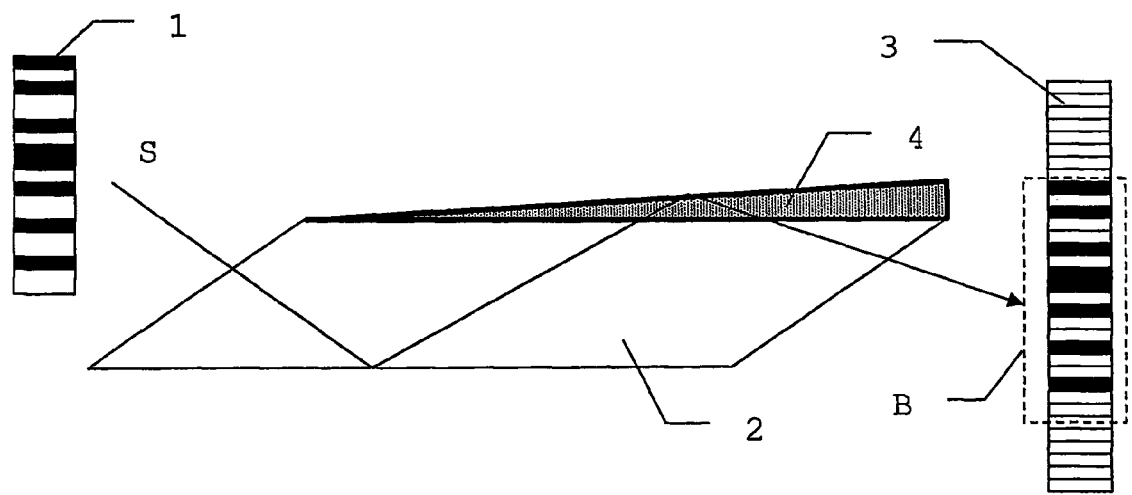

FIG. 1a-b describe an inclinometer according to the prior art which operates according to the reflection principle. FIG. 1a shows the condition in the case of a horizontal orientation of the inclinometer, whereas FIG. 1b shows the condition in the case of a slight inclination. In FIG. 1a, radiation S emitted by a radiation source is incident on a bar code as structure 1 to be imaged and is fed into a prism body 2, reflected there at an inner surface and reflected onto a liquid layer 4 present on the surface of the prism body 2. Further reflection at that surface of the liquid layer 4 which faces away from the prism body 2 and subsequent focusing onto a detector 3 take place, which detector 3 is formed here by way of example as a linear array. The structure 1 is focused on the detector 3 as an image B. The position of the image B is dependent on the angle of that surface of the liquid layer 4 which faces away from the prism body 2 relative to the prism body 2.

FIG. 1b shows a situation which is similar to FIG. 1a and in which the liquid layer 4 acquires a wedge-shaped cross-section owing to the inclination. As a result of this, the surfaces of the liquid layer 4 which face the prism body 2 and face away therefrom are no longer parallel but are present at an angle to one another. The radiation S reflected at the inner surface of the prism body now strikes a surface of the liquid layer 4 inclined differently compared with FIG. 1a and is thus projected at a different angle onto the detector 3. The image B of the bar code as structure 1 thus also shifts. The inclination can be deduced from the extent of the shift of the image B.

Figure 2:
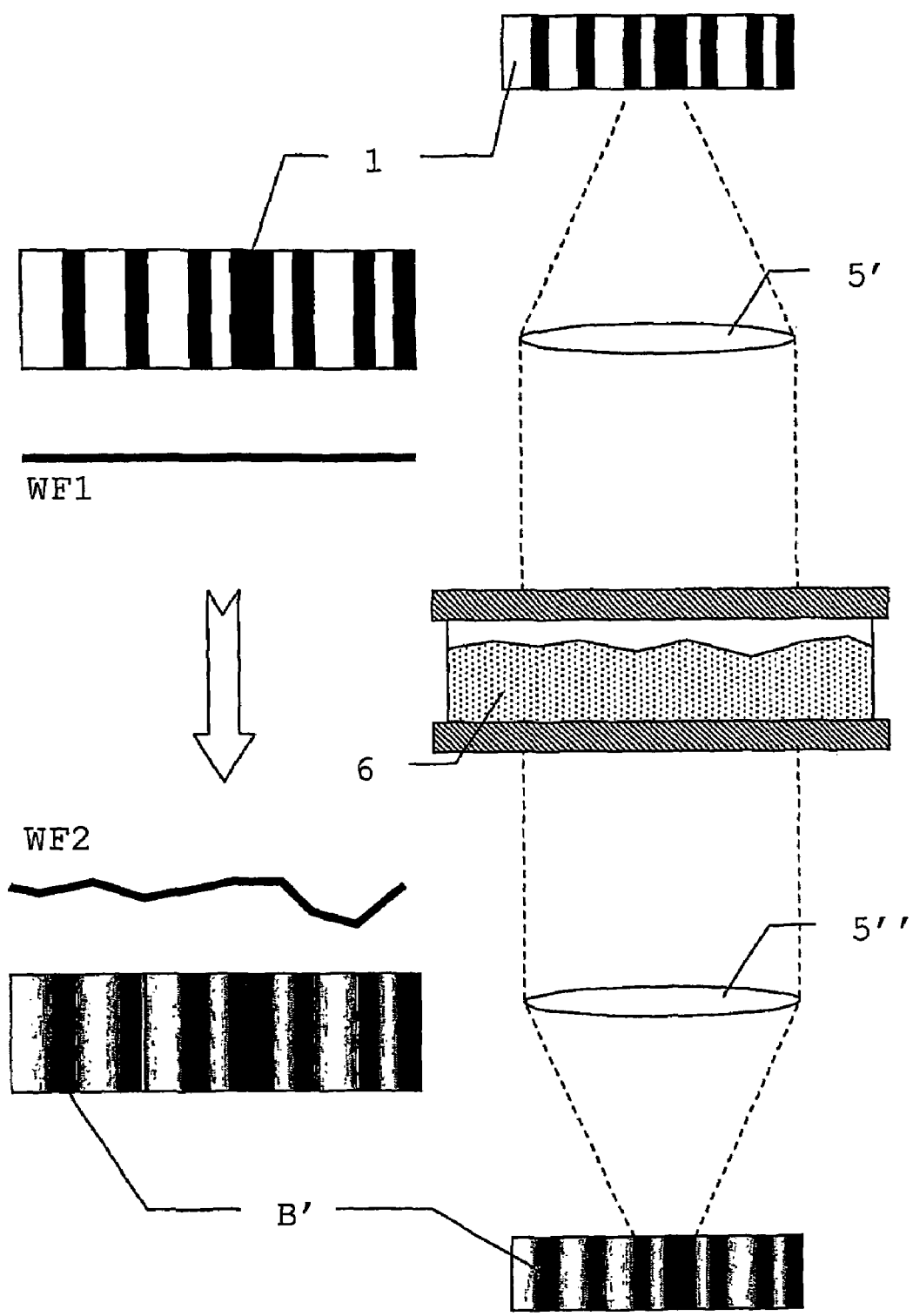

FIG. 2 schematically shows an inclinometer with transmission according to the prior art. A bar code as structure 1 is fed via an optical system comprising at least one collimating lens 5' through a medium 6 and is focused by means of an optical system comprising at least one focusing lens 5" onto a detector not shown explicitly here. The wavefront WF1 which is still flat or slightly spherical but undisturbed after passage through the transmittive bar code undergoes a change in its shape due to irregularities of the surface or inhomogeneities within the disturbed medium 6, so that a disturbed wavefront WF2 results. This change of the undisturbed wavefront WF1 into a disturbed wavefront WF2 leads to a likewise disturbed image B' on the detector. For example, the contrast in the structure 1 may be reduced by these influences so that the differentiation of individual features of the structure 1 is complicated or adversely affected.

The arrangement and effect, according to the invention, of a wavefront sensor is explained schematically in FIG. 3a-b, FIG. 3a illustrating the situation with an undisturbed medium 6' and FIG. 3b that with a disturbed medium 6.

In FIG. 3a, the radiation is incident on an undisturbed medium 6' and passes through it, passage taking place substantially perpendicularly to the surface in order to reduce losses and aberrations. After the passage, the wavefront WF3 is undisturbed and substantially flat. When the radiation strikes the wavefront sensor, which has a multiplicity of microlenses 7 having coordinated subapertures, the radiation of each subaperture is focused onto a camera 8. Since the wavefront WF3 is flat, it has the same parallel course everywhere and hence identical angle relative to the wavefront sensor, so that the focal points FP on the camera 8 are equidistant and are produced on the optical axis of each microlens 7.

FIG. 3b shows the situation for a disturbed wavefront WF4 which, after passage through the disturbed medium 6, has aberrations and hence a course which is no longer flat. The microlenses 7 in turn project the radiation captured by their respective subaperture onto the detector 8. Since the angle of the captured wavefront section is now locally different for each of these subapertures, the associated focal points FP also have different spacings. In the case of the subapertures which capture a non-parallel wavefront section, focal point FP and optical axis no longer coincide so that a deviation results. Since that region of the camera 8 which is coordinated with a subaperture has a plurality of pixels, the position of the focal point FP can be resolved and the angle of the wavefront section can therefore be deduced.

These conditions are illustrated once again in FIG. 4, and the parameters derivable for use according to the invention are schematically shown. The wavefront section captured by the subapertures of the individual microlenses 7 is focused onto the camera 8, it being possible for focal point SP and optical axis OA to coincide or to be separated depending on the specific course. For example, a focal point FP to the left of the optical axis OA (in this example) indicates radiation incident from the right, so that a corresponding inclination of the respective wavefront section can be derived. The extent of the separation of the focal point FP and optical axis OA is a function of the angle of the wavefront section.

Figure 5:
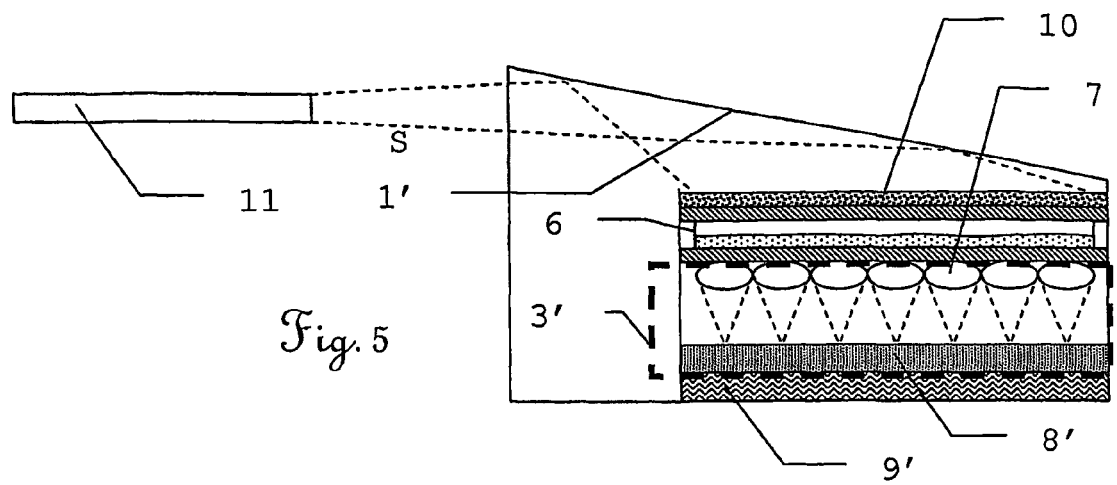
FIG. 5 shows the schematic diagram of a first embodiment of an inclinometer according to the invention in side view.

FIG. 5 shows a first embodiment of an optical inclinometer according to the invention. An oblique, reflective surface of the housing of an inclinometer according to the invention is illuminated by the radiation S fed into an optical fibre as local radiation source 11. The detector 3' has a wavefront sensor with a camera 8' and an upstream array of microlenses 7. An evaluation unit 9' is positioned on that side of the camera 8' which is opposite the incident radiation. By means of such an arrangement of the components, a particularly flat design of the inclinometer can be realized.

Figure 6:
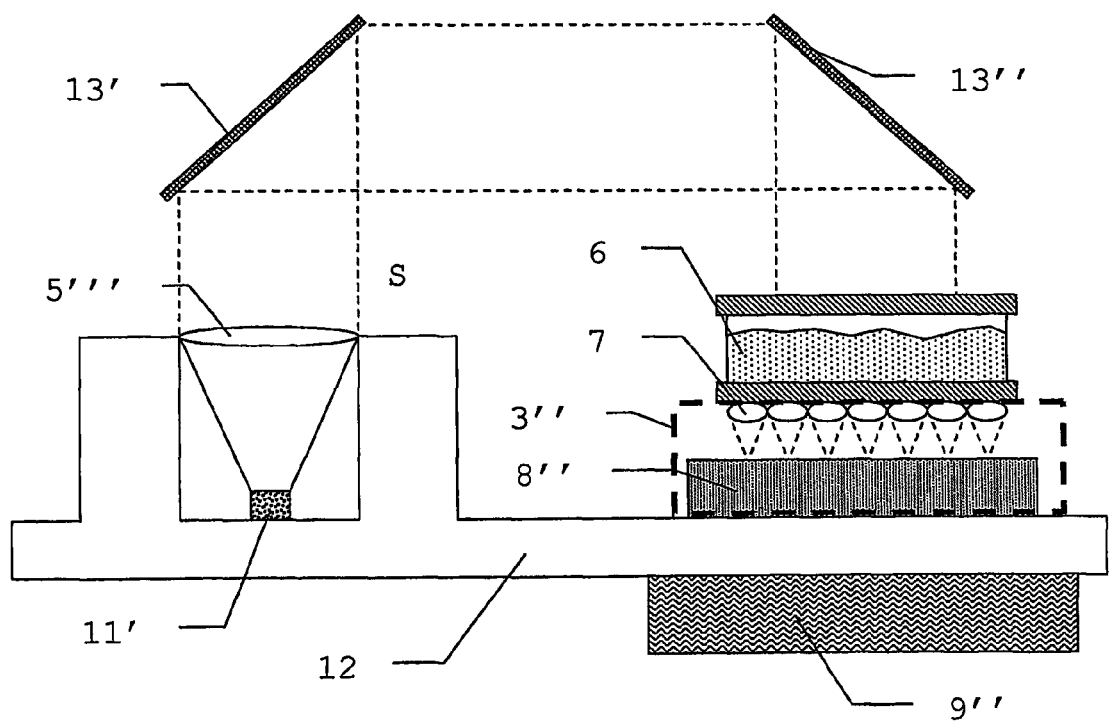
FIG. 6 shows the schematic diagram of a second embodiment of an inclinometer according to the invention in side view.

FIG. 6 schematically shows a second embodiment of an optical inclinometer according to the invention, with integration of all components on a plate as common base 12, in side view. Visible or invisible radiation S is emitted perpendicularly to the base 12 by a radiation source 11'. The radiation S is collimated by a lens 5''' and again deflected by means of a first deflection element 13' and a second deflection element 13'' so that it is incident perpendicularly to the base 1. In the region of the incident radiation, a container for the medium 6' having a first surface oriented relative to the base and a second surface oriented relative to the second deflection element 13'' is mounted on the base 1. A detector 3'' having a wavefront sensor comprising a camera 8'' and an upstream array of microlenses 7 is present between base 12 and the container or the first surface thereof. The detector 3'' is connected to an evaluation unit 9''. In order to save space, the components belonging to the beam generation, to the beam path and to the beam reception are mounted on one side of the base 12, but the evaluation unit 9''' on the opposite side of the base. 12, but in principle a different arrangement of the components or of the evaluation unit 9''' can also be chosen. This arrangement therefore has the advantage of the integration of all electronic components on a common base 12, which, for example, may also be in the form of a circuit board. This makes it possible to realize a simple and mechanically sensitive setup. The deflection elements 13' and 13'' may be in the form of reflective components, for example in the form of prisms or mirrors. In principle, if mounting on a common base 12 is dispensed with, however, direct mounting of the components one on top of the other is also possible, as shown in a second embodiment according to the invention in FIG. 5 or FIG. 7a-b.

FIG. 7a-b shows a third embodiment of an optical inclinometer according to the invention with coaxial arrangement of all components. The base 12' is substantially U-shaped and holds a radiation source 11'' between the two limbs. The radiation source emits radiation S, which is collimated by a lens 5'''. The collimated radiation S is then fed through the medium 6', which is mounted in a container indirectly or directly on the detector 3''' which has a wavefront sensor with a camera 8''' and microlenses 7 arranged in an extensive manner. An evaluation unit 9''' is mounted on that side of the base 12' which is opposite the detector 3'''.

FIG. 7b shows a plan view of the arrangement of the microlenses 7 of a wavefront sensor in a third embodiment of an inclinometer according to the invention, in which the radiation source, lens and container with the medium were omitted in the diagram. Here, the radiation is focused by means of the microlenses 7 arranged in an extensive manner onto the camera 8''' of the detector.

A possible form of the method according to the invention is explained schematically in FIG. 8. In the case of a detector setup, according to the principle explained in FIG. 4 with wavefront sensor, the individual pixels of the camera 8 are included in the evaluation only when the focal point FP1 coincides with the optical axis OA of the respective microlens 7 or the deviation thereof from one another is within a specified tolerance. Only the pixels which satisfy this condition are then read out or further processed for the evaluation, so that only that part of the image which can be received without aberration is used. It is also possible to correlate different pixels with one another; in particular, pixels can be combined to form larger superstructures. Furthermore, image processing methods known per se can be applied to the image thus obtained, in order to obtain an improvement in the optical parameters.

FIG. 9 schematically shows an embodiment of the wavefront sensor according to the invention. Arranged in front of the microlenses 7 is a diffractive element 14 by means of which the radiation arriving from the wavefront WF4 is diffracted. This diffractive element may be, for example, a hologram, a grating, in particular a Dammann grating, or another optical-gradient structure. In addition to the direct positioning above the microlenses 7, mounting at another point in the beam path, for example on one of the deflection mirrors of FIG. 6 or in the immediate vicinity of the medium, for example on a glass of the container, is also possible. The diffraction effect produces on the camera 8 a plurality of intensity structures 15 which are correlated with one another, instead of or in addition to the undisturbed focal point FP2. Depending on the design of the diffractive element 14 and the shape of the wavefront WF4, these structures can also be imaged in regions which, in the case of a wavefront sensor without diffractive element 14, would in each case have been assigned exclusively to another subaperture. In addition to the higher diffraction orders, these structures may also be, for example, expanded Fourier images of the diffractive element. It is thus possible, for each subaperture, to use a larger region of the camera 8 for detection and thus to achieve a higher resolution, larger detectable angle ranges and/or a larger dynamic region.

The embodiments shown represent only examples of realizations according to the invention and are therefore not to be understood as being definitive and limiting. In addition, the person skilled in the art can derive further embodiments according to the invention, for example with the use of other beam paths or deflection elements, such as, for example, prisms, scattering surfaces or optical fibres, or alternative forms of the detector and of the wavefront sensor.

The figures show the lenses of the wavefront sensor and in particular the number and size thereof purely schematically. In the real embodiments, the number of lenses is generally greater so that higher resolutions of the position or angle can be realized.

The invention claimed is:

1. An optical inclinometer, comprising
a radiation source for generating radiation;
a medium having an inclination-sensitive surface and having an optical interface which is inclination-dependent;
a detector for recording and converting an image into signals; and
an evaluation unit for determining an inclination;
wherein the radiation source and the detector are arranged so that a wavefront of the radiation is focused indirectly or directly, in reflection and/or transmission, onto the detector by at least a part of the medium;
wherein the detector has a wavefront sensor or the detector is the wavefront sensor.

2. The optical inclinometer according to claim 1, wherein the medium is a liquid.

3. The optical inclinometer according to claim 1, wherein the radiation source, the medium and the detector are arranged so that the radiation is fed substantially perpendicularly to at least one surface of the medium during a passage through the medium.

4. The optical inclinometer according to claim 1, wherein the detector has at least one diffractive element which is arranged on an array of microlenses.

5. The optical inclinometer according to claim 1, wherein the detector is a Shack-Hartmann wavefront sensor or has a Shack-Hartmann wavefront sensor.

6. The optical inclinometer according to claim 1, wherein the detector is mounted indirectly or directly on a container containing the medium.

7. The optical inclinometer according to claim 1, wherein the detector has a detector surface which has two dimensions.

8. The optical inclinometer according to claim 1, wherein the radiation source and the detector are arranged on a common base.

9. The optical inclinometer according to claim 8, wherein the radiation source and the detector are arranged so that the radiation generated is emitted perpendicularly to a surface of the base and a receiving direction of the detector is oriented perpendicularly to the surface of the base.

10. The optical inclinometer according to claim 1, wherein at least one deflection element is arranged in a beam path from the radiation source to the detector.

11. The optical inclinometer according to claim 1, wherein at least one diffractive and/or optical-gradient element is arranged in a beam path from the radiation source to the detector.

12. A geodetic device comprising an inclinometer according to claim 1.

13. A method for measuring an inclination of a device that includes a radiation source for generating radiation; a medium having an inclination-sensitive surface and having an optical interface which is inclination-dependent; a detector for recording and converting an image into signals; and an evaluation unit for determining an inclination, wherein the radiation source and the detector are arranged so that a wavefront of the radiation is focused indirectly or directly, in reflection and/or transmission, onto the detector by at least a part of the medium,
the method comprising the steps of:
focusing of the wavefront of the radiation onto the detector;
recording of the signals of the detector; and
evaluating of the signals and determining of the inclination of the device;
wherein during the evaluating of the signals, information about the wavefront of the radiation is derived.

14. The method according to claim 13, wherein, during the evaluating of the signals, an analysis of the deviation of the wavefront of the radiation from the wavefront before an interaction with the medium is effected.

15. The method according to claim 13, wherein, during the recording of the signals and/or during the evaluating of the signals, a reconstruction of the wavefront of the radiation before an interaction of the medium is effected.

16. The method according to claim 13, wherein, during the recording of the signals and/or during the evaluating of the signals, individual image points of the detector are selected.

17. The method according to claim 13, wherein, during the evaluating of the signals, the form function is derived by a polynomial approach.

18. The method according to claim 13, wherein, during the recording of the signals and/or during the evaluating of the signals, different apertures are correlated with one another.

19. The method according to claim 13 being used for compensating vibrations and/or random fluctuations of at least one surface of the medium.

20. A wavefront sensor for use in an optical inclinometer according to claim 1, comprising:
a camera for recording and converting the image into the signals; and
an array of microlenses,
wherein that at least one diffractive element is coordinated with the array of microlenses.

21. The wavefront sensor according to claim 20, wherein the diffractive element is a hologram or a grating.

22. The optical inclinometer according to claim 1, wherein the radiation source is a semiconductor laser or an LED.

23. The optical inclinometer according to claim 1, wherein the detector has a CMOS microcamera or CCD microcamera.

24. The optical inclinometer according to claim 7, wherein the orientation of the detector surface is parallel to a surface of the medium.

25. The optical inclinometer according to claim 8, wherein the common base is a circuit board.

26. The optical inclinometer according to claim 11, wherein the at least one diffractive and/or optical-gradient element is a Fresnel lens.

27. The optical inclinometer according to claim 12, wherein the geodetic device is a telemeter or a plumb staff.

28. The method according to claim 13, for measuring the inclination of a device, wherein the device is a geodetic device.

29. The method according to claim 13, wherein the radiation source is a semiconductor laser or an LED.

30. The method according to claim 13, wherein the information about the wavefront of the radiation is a form function of the of the radiation.

31. The method according to claim 13, wherein the detector has a CMOS microcamera or a CCD microcamera.

32. The method according to claim 16, wherein only the individual image points are used for determining the inclination of the device.

33. The method according to claim 17, wherein the polynomial approach uses Zernike polynomials.

34. The wavefront sensor according to claim 20, wherein the camera includes a CMOS microcamera or a CCD microcamera.

35. The wavefront sensor according to claim 21, wherein the diffractive element is a Dammann grating.

* * * * *

UNITED STATES PATENT AND TRADEMARK OFFICE
CERTIFICATE OF CORRECTION

PATENT NO. : 7,649,621 B2  Page 1 of 1
APPLICATION NO. : 10/560432
DATED : January 19, 2010
INVENTOR(S) : Bernhard Braunecker et al.

It is certified that error appears in the above-identified patent and that said Letters Patent is hereby corrected as shown below:

On the face of the patent, replace item (30) as follows:

--(30)   Foreign Application Priority Data

Jun. 23, 2003   (EP)........................03101841.9--

Signed and Sealed this

Twentieth Day of April, 2010

David J. Kappos
*Director of the United States Patent and Trademark Office*